United States Patent Office 2,916,519
Patented Dec. 8, 1959

2,916,519

PRODUCTION OF THIOETHER GLYCOLS

Christian Wegner, Leverkusen, Hans Holtschmidt, Koln-Stammheim, and Kurt Hess, Leverkusen, Germany, assignors, by mesne assignments, to Mobay Chemical Company, Pittsburgh, Pa., a corporation of Delaware No Drawing. Application May 29, 1957
Serial No. 662,337

Claims priority, application Germany June 14, 1956

5 Claims. (Cl. 260—609)

This invention relates to a process for preparing thioether glycols. More particularly, the invention is concerned with a process for producing thioether glycols which contain a plurality of thioether groups.

It is well known to produce thioether glycols containing one thioether group by reacting hydrogen sulfide with alkylene oxides. Thus, ethylene oxide and hydrogen sulfide react to form beta,beta'-dihydroxy diethyl sulfide in a yield of over 90%. This reaction may be represented by the following equation

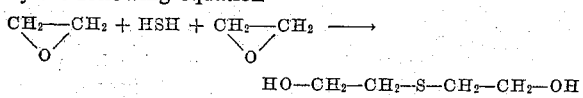

HO—CH$_2$—CH$_2$—S—CH$_2$—CH$_2$—OH

Cyclohexene oxide, propylene oxide, styryl oxide and other alkylene oxides react with hydrogen sulfide in the same manner, forming the corresponding thioether glycols with one thioether group.

Thioether glycols containing more than one thioether group in their molecule are much more difficult to obtain. In accordance with German Patent 405,384, triethylene dithioglycol can be prepared by reacting ethylene chloride with potassium sulfhydrate in alcohol followed by reaction of the product thus formed with ethylene chlorhydrine. Another method for making thioether glycols containing more than one thioether group involves the alkoxylation of dimercaptans. Both methods are inconvenient to carry out and result in poor yields.

It is, therefore, a primary object of the present invention to provide a process for the production of thioether glycols containing a plurality of thioether groups which can be carried out in a simple manner. Another object of the present invention is to provide a process for the production of thioether glycols containing a plurality of thioether groups, which is suitable for large scale operation. A further object of the invention is to provide a process for the production of thioether glycols containing a plurality of thioether groups which results in good yields. Still further objects will appear hereinafter.

These objects are accomplished in accordance with the present invention by reacting an alkylene oxide with hydrogen sulfide either in the presence of a sulfur derivative of carbon dioxide or at elevated temperature and in the presence of excess hydrogen sulfide.

Any suitable alkylene oxide may be used in the practice of the invention including, for example, ethylene oxide, propylene oxide, glycide, epichlorohydrin, phenoxypropene oxide, cyclohexene oxide and styryl oxide.

Any suitable thio derivative of carbon dioxide may be utilized. Those which are especially suitable for carrying out the process of the present invention include carbon disulfide, carbon oxysulfide, and also mono-, di- and trithiocarbonic acid, their salts and esters, thiourea, thiocarbamic acid and its salts and esters, and thiocyanic acid and its salts and esters.

In carrying out the reaction between the alkylene oxide, hydrogen sulfide and the thio derivative of carbon dioxide, it is advantageous and preferred to use about 2 mols of the alkylene oxide and about 0.1 to 1 mol of the thio derivative of carbon dioxide per 1 mol of hydrogen sulfide, but the reactants may also be brought together in other proportions, if desired. In order to initiate the reaction, it is advisable to add a small amount of a thioether glycol. Activated carbon, silica gel and other materials having a large surface also act beneficially on the reaction. It is preferred to conduct the reaction at slightly elevated temperatures, temperatures within the range of about 70° to about 110° C. being especially suitable.

A very convenient way of carrying out the exothermic reaction between the alkylene oxide, hydrogen sulfide and the thio derivative of carbon dioxide involves feeding hydrogen sulfide and the alkylene oxide to a column packed with Raschig rings or any other suitable packing or filling material. The thio derivative of carbon dioxide may be introduced into the reaction zone by dropping it onto the filling material in the column. Alternatively, the thio derivative of carbon dioxide may be added to either one of the other reactants or a mixture of the three components may be fed to the column.

If carbon disulfide is the thio derivative of carbon dioxide used in the process of the invention, all the sulfur contained therein is exchanged for oxygen and as a result the equivalent amount of carbon dioxide is formed. With ethylene oxide as the starting material, the reaction leads to the formation of a mixture containing thio diglycol, triethylene dithio glycol, tetraethylene trithio glycol and higher homologues thereof, the proportion of glycols having a higher sulfur content rising as more carbon disulfide is used.

In accordance with another embodiment of the process of the invention, the alkylene oxide is reacted with excess hydrogen sulfide at elevated temperature. This embodiment of the process of the invention is based on the discovery that at temperatures above 110° C. hydrogen sulfide itself can also act as a sulfur-yielding component when contacted with an alkylene oxide. In this case, the equivalent amount of water is formed in the reaction and the proportion of the glycols with a higher sulfur content rises with the reaction temperature and with the excess of hydrogen sulfide utilized. The temperatures employed in this embodiment of the process of the reaction are preferably above 140° C.

Higher temperatures can also be employed. In some cases for instance, a temperature up to 250° C. is desirable. It is preferred to use the hydrogen sulfide in excess of about 100%, but a much greater excess of 400 to 500% is possibly used.

The thioether glycols containing a plurality of thioether groups, which are obtainable by the process of the invention, are suitable as additives to lubricants and also as plasticizers and as intermediates in the manufacture of plastics. Since the products of the present invention have active hydrogen atoms in form of terminal hydroxyl groups they are especially adapted for reaction with NCO groups to give polyurethanes which are highly useful as foams, lacquers, films, foils, adhesives or the like.

The invention is further illustrated by the following examples without being restricted thereto.

*Example 1*

Thiodiglycol is passed at 80° C. through a Raschig ring column in counter-current to a gas mixture which is composed of two parts by volume of ethylene oxide, 0.8 part by volume of hydrogen sulfide and 0.2 part by volume of carbon disulfide vapor.

The reaction starts immediately and the waste gases contain mainly carbon dioxide as well as unreacted hydrogen sulfide and ethylene oxide and traces of carbon disulfide.

After cooling, the reaction product is obtained as a light yellow paste.

Softening point, ° C. _____ about 45
S content _____ 31.0
OH content _____ 22.3

From 100 parts of this reaction product, there are obtained by distillation 603 parts of thiodiglycol
65 parts of triethylene dithioglycol
305 parts of tetraethylene trithioglycol (+higher homologues)

*Example 2*

A stream of gas consisting of 2 parts by volume of ethylene oxide and 0.9 part by volume of hydrogen sulfide is introduced into thiodiglycol heated to 90° to 100° C. 0.1 part by volume of carbon disulfide is introduced as liquid directly into the heated thiodiglycol.

The carbon disulfide which is incorporated by stirring, is converted almost quantitatively into carbon dioxide which leaves the reaction chamber as waste gas.

Part of the reaction product solidifies on cooling.

S content _____ 28.3
OH content _____ 22.5

The product contains about 16% of a solid constituent which consists mainly of the tetraethylene trithioglycol described in Example 1.

*Example 3*

Following the procedure described in Example 1, a gas mixture consisting of 9 parts by volume of ethylene oxide, 4 parts by volume of hydrogen sulfide and 2 parts by volume of carbon oxysulfide is introduced into thiodiglycol heated to 90° to 100° C. The waste gas leaving the reaction tower contains carbon oxysulfide and carbon dioxide in the ratio of 1:2 as well as unreacted ethylene oxide and hydrogen sulfide. The conversion of the carbon oxysulfide thus proceeds more slowly than that of the carbon disulfide.

Part of the reaction product solidifies on cooling.

Percent
S content _____ 27.1
OH content _____ 22.5

The solid constituent of the reaction product consists to a large extent of tetraethylene trithioglycol.

*Example 4*

To a Raschig ring column which is charged with thiodiglycol heated to 150° C. ethylene oxide and hydrogen sulfide are fed in counter-current in gaseous form and in the ratio by volume of 2:2.2. The waste gas consists mainly of steam, which is discharged from the reaction tower and condensed in a descending condenser.

The reaction product has a S content of 29.8% and an OH content of 20.6% and a part solidifies on cooling. The solid constituent has the same composition as the reaction product of Example 1.

*Example 5*

Dioxydipropyl sulfide is heated to about 90–100° C. 2 parts by weight of propylene oxide and simultaneously 0.8 part by volume of hydrogen sulfide and 0.2 part by volume of carbon disulfide gas are introduced into this medium.

The reaction starts immediately and the waste gases contain mainly carbon dioxide as well as unreacted hydrogen sulfide. The reaction product is a pale yellow viscous water-insoluble oil. Sulfur content 27.5%.

*Example 6*

A column is packed with Raschig rings and charged with dioxydipropyl sulfide heated to 160° C. Gaseous propylene oxide and hydrogen sulfide are passed in countercurrent through this column in a ratio by volume of 2:1.5. The waste gas consists mainly of steam which is discharged from the reaction tower and condensed in a descending condenser.

The reaction product has a sulfur content of 27%.

While certain representative embodiments and details have been shown for the purpose of illustrating this invention, it will be apparent to those skilled in the art that various changes and modifications may be made therein without departing from the spirit and scope of the invention.

What is claimed is:

1. Process for the production of a mixture containing thiodiglycol, triethylene dithioglycol, tetraethylene trithioglycol and higher homologues thereof which comprises contacting thiodiglycol in a packed column with a mixture containing about 2 mols of ethylene oxide, 0.1 to 1 mol of a member selected from the group consisting of carbon disulfide, carbon oxysulfide, and excess hydrogen sulfide.

2. A method for making a substantially linear thioether glycol having a plurality of thioether groups which comprises reacting an alkylene oxide with hydrogen sulfide in the presence of carbon disulfide.

3. A method for making a substantially linear thioether glycol having a plurality of thioether groups which comprises reacting an alkylene oxide with hydrogen sulfide in the presence of carbon oxysulfide.

4. A method for making a substantially linear thioether glycol having a plurality of thioether groups which comprises reacting an alkylene oxide with hydrogen sulfide in the presence of a member selected from the group consisting of carbon disulfide, carbon oxysulfide and excess hydrogen sulfide.

5. A method for making a substantially linear thioether glycol having a plurality of thioether groups which comprises reacting at a temperature of at least about 110° C. an alkylene oxide with hydrogen sulfide while maintaining an excess of hydrogen sulfide in the reaction mixture throughout the reaction.

References Cited in the file of this patent

Yur'er Doklady Akad Nauk S.S.S.R. 63, 285–288 (1948), cited in C.A., 43, 2624g (1949).

Nenitzescu et al.: Ber. Deut. Chem., 68, 587–591 (1935), cited in C.A., 29, 3979[1] (1935).

UNITED STATES PATENT OFFICE
CERTIFICATE OF CORRECTION

Patent No. 2,916,519

December 8, 1959

Christian Wegner et al.

It is hereby certified that error appears in the above numbered patent requiring correction and that the said Letters Patent should read as corrected below.

In the grant, lines 3, 4, and 5, for "assignors, by mesne assignments, to Mobay Chemical Company, of Pittsburgh, Pennsylvania, a corporation of Delaware," read -- assignors, by direct and mesne assignments, of one-half to Farbenfabriken Bayer Aktiengesellschaft, of Leverkusen, Germany, a corporation of Germany, and one-half to Mobay Chemical Company, of Pittsburgh, Pennsylvania, a corporation of Delaware, --; line 14, for "Mobay Chemical Company, its successors" read -- Farbenfabriken Bayer Aktiengesellschaft and Mobay Chemical Company, their successors --; in the heading to the printed specification, lines 3, 4, and 5, for "assignors, by mesne assignments, to Mobay Chemical Company, Pittsburgh, Pa., a corporation of Delaware" read -- assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware --.

Signed and sealed this 17th day of May 1960.

(SEAL)
Attest:

KARL H. AXLINE
Attesting Officer

ROBERT C. WATSON
Commissioner of Patents